Figure 1:
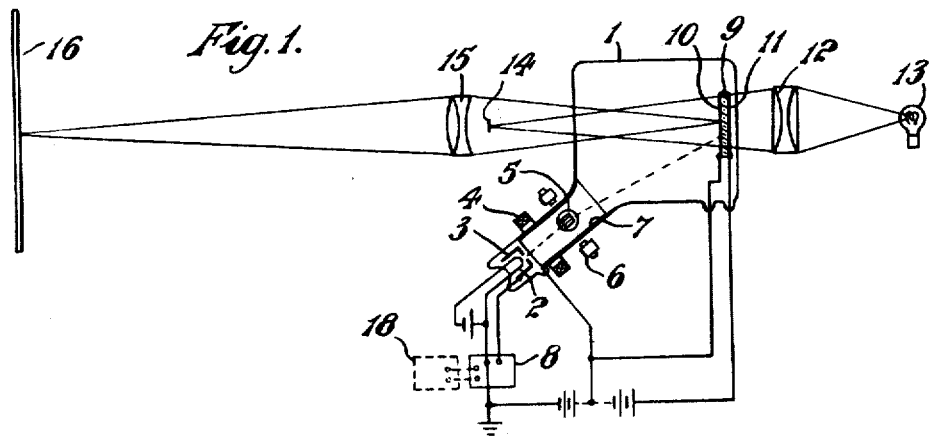

Dec. 29, 1942.    A. H. ROSENTHAL    2,306,407

TELEVISION RECEIVER

Filed March 11, 1939

Inventor
Adolf H. Rosenthal

Patented Dec. 29, 1942

2,306,407

UNITED STATES PATENT OFFICE 2,306,407

TELEVISION RECEIVER

Adolf Heinrich Rosenthal, Kensington, London, England, assignor, by mesne assignments, to Scophony Corporation of America, New York, N. Y., a corporation of Delaware Application March 11, 1939, Serial No. 261,331
In Great Britain March 18, 1938

5 Claims. (Cl. 178—7.5)

The present invention relates to television receivers, and is a continuation in part of my co-pending application Serial No. 253,182 filed January 27, 1939, which is concerned with a novel form of image screen for a television receiver. By the term image screen is meant a screen, the optical properties of which change from point to point in accordance with received picture signals, so that such a screen can be imaged with the aid of light from an external source on to a projection screen to give a representation of the picture.

If certain crystals, which are normally transparent to visible light, are struck by a beam of cathode rays, X-rays, radium rays or by light of a suitable wave length, a deposit of opaque material, which is constituted by what will hereinafter be referred to as "opacity centres," is created in this crystal, the degree of opacity depending on the intensity of the incident radiation. Examples of such crystals are many of the alkali and alkaline earth halides, such as the chlorides, bromides and iodidides of sodium and potassium, lithium bromide, calcium fluoride, and strontium fluoride and chloride; and also certain silver salts such as silver bromide. All these materials belong to the class of the so-called "ionic crystals," i. e. crystals in which there are positive and negative components, and the forces that hold them together are electrostatic, at least in part. In the case of the alkali halide crystals research has indicated that the opacity centres probably consist of neutral alkali atoms which are loosely bound in the interior of the crystals in some manner or other, and which are similar to the deposit of metallic silver in a latent photographic image. The deposit of metal in the crystal lattice can also be created by heating an alkali halide crystal in an atmosphere of the vapour of its alkali metal, which diffuses in the crystal.

Once formed, the opaque deposit can also be destroyed by the above mentioned rays, the amount of destruction in a given time interval depending on the intensity of the rays and on the density of the deposit already formed. Thus the gross effect of any given intensity of the incident radiation, being the result of an equilibrium between the formation and destruction of the deposit, may be an increase of the deposit for low intensities and a decrease for the high intensities, in a manner similar to the well known "Solarisation" of the latent photographic image. Thus, over a range of low intensities of the incident radiation, increase in intensity will result in an increase of the deposit, whilst over a range of high intensities an increase in intensity will result in a decrease of the deposit.

The materials exhibiting this property may be defined as those of the ionic type in which the injection of electrons into the crystal lattice can give rise to an opaque deposit in said lattice.

In the co-pending application referred to above there is contemplated the use of a transparent crystalline material of the type defined in the image screen of a television receiver. The material may be in the form of a single flat crystal, a mosaic of small crystals, or a micro-crystalline structure. A composite crystal or a mixture of two or more of such crystalline materials may be used.

In most cases, and particularly when the material is in the form of a single crystal, a disappearance of the opaque deposit can be produced by maintaining the crystal in an electric field and at a suitable temperature, in which case the deposit is drawn through the crystal towards the positive pole producing the electric field. When it reaches the positive pole is disappears, leaving the crystal substantially transparent. The speed of movement of the deposit depends upon the strength of the field and upon the temperature, and can be varied within wide limits by varying either magnitude. For a given field strength this speed of movement increases with the temperature of the crystal.

In the various embodiments described in the co-pending application referred to above, conditions are such that the opaque deposit in the image screen constitutes in itself a visible image, and consequently this image can be directly projected on to a projection screen.

The formation of opacity centres at any given elemental area of the screen is accompanied by a corresponding change in the refractive index of this area, with respect to the refractive index of the remaining areas, due to the temporary liberation of electrons and the presence of free or loosely bound electrons in the substance of the screen. Instead of, or in addition to, the changes in opacity of the screen these changes in refractive index can be utilized to produce a visible image, and it is an object of the present invention to provide means whereby this utilization of the changes of refractive index can be achieved.

According to the present invention a television receiver comprises a image screen of a material of the type defined, means for scanning the screen with a beam of radiant energy modulated in intensity in accordance with the received picture signals to produce a change in the refractive index of the material of each elemental area in turn, the degree of change depending upon the instantaneous intensity of the beam striking the area, means for illuminating said image screen, optical means for separating the portion of the light which undergoes a change of direction due to said change in refractive index from the remaining portion, and means for directing one of said portions on to a projection screen.

The chief advantage of the present invention is that where the conditions are such that the density or tint of the opaque deposit are not suitable for the production of a satisfactory visible picture, the method of the present invention can be used to overcome this difficulty.

Figure 2:

The invention will now be described by way of example with reference to the accompanying drawing in which Fig. 1 shows schematically one form of the invention, and Fig. 2 shows an alternative form of construction of the image screen.

Referring to Fig. 1, a cathode ray tube 1 is provided with a cathode 2, a control grid 3, a beam focussing coil 4, deflecting coils 5, 6 and an accelerating anode 7. Picture signals from the receiver 8 are applied between the cathode and control grid in such a way that the positive potential of the grid decreases with increase in signal strength, so that a modulated beam is produced and is swept over the image screen in the usual manner. The image screen consists of a flat crystal 9 of an alkali halide such as potassium chloride, provided on each side with an electrode 10, 11 designed to permit the passage of light. These electrodes are shown in the form of thin transparent sputtered metallic layers, but they can also be in the form of fine meshes or the like. The potential of the electrode 11 is maintained positive with respect to that of the electrode 10 to provide an electric field in the crystal.

As explained in detail in the co-pending application referred to above a fugitive image in the form of an opaque deposit is produced in the crystal 9 which travels through the crystal and disappears at the electrode 11, and normally it is possible to project this image directly on to a receiving screen. The formation of this image is accompanied by a corresponding change in the refractive index of the crystal, this change, for any given elemental area of the crystal depending upon the intensity of the cathode ray beam when it strike the area.

According to the present invention, this change in the refractive index is also utilized in forming a visible image on receiving screen. In Fig. 1 the so-called Töpler-Schlieren method is used for this purpose, and to this end the condenser lens system 12 forms an image of the light source 13 on the opaque bar 14, so that in the absence of any changes in the refractive index of the crystal 9, no light proceeding from the crystal can pass the bar 14.

If now a change in the refractive index, and hence a change in the optical path through the material forming a given elemental area of the crystal is produced, the light rays passing through this area will experience a change of direction, so that some of the light will pass the bar 14. This light is utilized by the projection lens 15 to form an image of the crystal surface on the projection screen 16.

In order to obtain a satisfactory picture on the projection screen 16 it is necessary that the quantity of light proceeding from a given elemental area of the crystal which passes the bar 14 should be substantially proportional to the intensity of the radiant energy producing the change in the optical path in the elemental area, since it is this quantity of light which determines the intensity of the corresponding elemental area of the picture on the screen 16. Now this quantity of light is not proportional to the optical path through the elemental area under consideration but is proportional to the first differential of this, i. e. if $y$ represents the geometrical path through the crystal (if the light is incident normally on the crystal $y$ will represent the thickness of the crystal), if $n$ represents the refractive index of the material of the elemental area, and if $x$ represents any linear dimension of the area in the plane of the crystal, then $yn$ gives the optical path and the quantity of light passing the bar 14 is proportional to $$\frac{d(yn)}{dx}$$

This latter expression will be hereinafter referred to as the gradient of the optical path.

This gradient along the screen surface in the optical path through each elemental area of the screen may be produced by modulating the intensity of the scanning beam with high frequency oscillations derived from the source 18, the frequency of these oscillations being in the neighbourhood of element frequency, so that there is produced a gradient in the refractive index of the crystal in the line scanning direction over each elemental area, and hence a gradient in the optical path. This gradient is then altered by the signal modulations superimposed on the high frequency modulations. This effect can also be produced by using an unmodulated beam (except for the signal modulations) and interposing a fine metallic grating (19, Fig. 3) at or near the scanned surface of the crystal, or such a grating may be in the form of a partly transparent metallic deposit on the crystal surface and acting at the same time as one of the crystal electrodes.

Alternative methods of producing the desired changes in refractive index in the image screen can be employed. These methods are substantially identical with the various alternative methods of producing the opaque deposit in the screen which are described in detail in the co-pending application referred to above, and need not be described in the present specification.

I claim as my invention:

1. A television or like receiver comprising a cathode ray tube, an image screen in said tube comprising a material of the ionic crystal glass and of the type in which the injection of electrons into the crystal lattice can give rise to an opaque deposit in said lattice, means for modulating the cathode ray beam in accordance with received signals and for causing it to scan said screen, a light source for illuminating and causing light to pass through said screen, an optical stop on the side of said screen remote from said light source, an optical system adapted to form an image of said light source on said stop, and optical means for utilizing light which undergoes a change in intensity in passing through said screen as a result of the opacity thereof, and which passes said stop to form an image of said screen on a projection screen.

2. A television or like receiver comprising a cathode ray tube, an image screen in said tube comprising a material of the ionic crystal class and of the type in which the injection of electrons into the crystal lattice can give rise to an opaque deposit in said lattice, a grating on said screen, means for modulating the cathode ray beam in accordance with received signals and for causing it to scan said screen, a light source for illuminating and causing light to pass through said screen, an optical stop on the side of said screen remote from said light source, an optical system adapted to form an image of said light source on said stop, and optical means for utilizing light which undergoes a change in intensity in passing through said screen as a result of the opacity thereof, and which passes said stop to form an image of said screen on a projection screen.

3. A television or like receiver as claimed in claim 2 wherein said grating is in the form of a partly transparent metallic deposit on said screen.

4. A television or like receiver comprising a cathode ray tube, an image screen in said tube comprising a material of the ionic crystal class and of the type in which the injection of electrons into the crystal lattice can give rise to an opaque deposit in said lattice, a source of high frequency oscillations, means for modulating the cathode ray beam in accordance with said high frequency oscillations from said source and with received signals, and means for causing said beam to scan said screen, a light source for illuminating and causing light to pass through said screen, an optical stop on the side of said screen remote from said light source, an optical system adapted to form an image of said light source on said stop, and optical means for utilizing light which undergoes a change in intensity in passing through said screen as a result of opacity thereof, and which passes said stop to form an image of said screen on a projection screen.

5. In a television receiver, the combination comprising an image screen of a material of the ionic crystal class and of the type in which the injection of electrons into the crystal lattice can give rise to an opaque deposit in said lattice, means for scanning said screen with a cathode ray beam, a source of high frequency oscillations, means for modulating said cathode ray beam with said oscillations so that said beam produces over each elemental area a gradient in the optical path through the material of said element, said cathode ray beam being further modulated in intensity in accordance with received picture signals, and adapted to produce a modulation of the gradient of the optical path for each elemental area of the screen in turn, the degree of this modulation depending upon the instantaneous intensity of the beam striking the area, a light source for illuminating and causing light to pass through said screen, an optical stop on the side of said screen remote from said light source, an optical system adapted to form an image of said light source on said stop, and optical means for utilising light which undergoes a change in intensity in passing through said screen due to said modulation of the gradient of the optical path from the remaining portion and which passes said stop to form an image of said screen on a projection screen.

ADOLF HEINRICH ROSENTHAL.